(No Model.)
H. A. MANNING.
COOKING VESSEL.
No. 403,279.        Patented May 14, 1889.
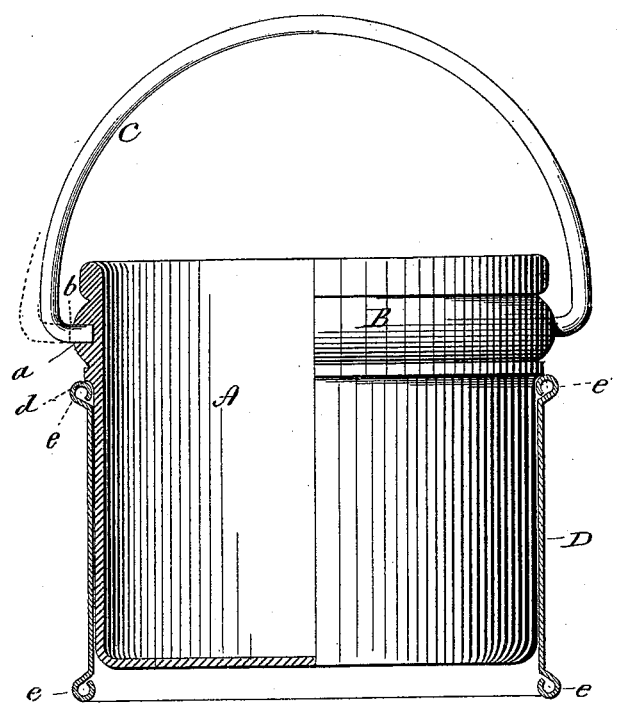

UNITED STATES PATENT OFFICE.

HENRY A. MANNING, OF NEW YORK, N. Y.

COOKING-VESSEL.

SPECIFICATION forming part of Letters Patent No. 403,279, dated May 14, 1889.

Application filed October 17, 1887. Serial No. 252,534. (No model.)

*To all whom it may concern:*

Be it known that I, HENRY A. MANNING, of New York, in the county of New York and State of New York, have invented a new Improvement in Cooking-Vessels; and I do hereby declare the following, when taken in connection with accompanying drawing and the letters of reference marked thereon, to be a full, clear, and exact description of the same, and which said drawing constitutes part of this specification, and represents in the figure a central sectional side view of the kettle complete.

This invention relates to an improvement in that class of cooking-vessels which consist of a porcelain vessel having a jacket surrounding it to form a chamber outside the kettle, the said jacket serving to support the kettle over the surface from which the heat is derived, and so that the kettle will not come in contact with the said heating-surface; and the invention consists in the construction as hereinafter described, and particularly recited in the claim.

A represents the kettle, made from porcelain or similar material. Around its outside and immediately below its upper edge is a broad band, B, which projects from the outer surface of the kettle. Into this band, at diametrically-opposite points, radial recesses $a$ are formed in the process of making the kettle.

C represents the bail, which is made from wire, of U shape, the ends at each side turned radially inward into line with each other, and so as to form pivots $b$, corresponding to the recesses $a$ in the kettle, the normal condition of the bail being such that the distance between the two ends of the pivots corresponds substantially to the diameter of the kettle at the bottom of the said recesses, and so that the bail may be sprung open, one end passed into the recess in one side, and the opposite end into the recess on the opposite side, and, as indicated in broken lines in the figure, these ends resting so loosely in the recesses that they form pivots upon which the bail may swing to either side.

The bail may be readily removed by spreading the two sides, so as to withdraw the ends from the respective recesses, and in like manner replaced.

The kettle is constructed with an annular shoulder, $d$, below the recesses, into which the bail hinges, and, preferably, from that point downward the kettle diminishes in diameter.

D represents the jacket, which is made from a strip of sheet metal, preferably iron, of somewhat greater width than the distance from the shoulder $d$ to the bottom of the kettle, and it is of ring shape, its internal diameter somewhat larger than the external diameter of the body of the kettle. At both the upper and lower edge of the jacket a bead, $e$, is formed, and the internal diameter of both these beads corresponds substantially to the external diameter of the kettle at the shoulder, or little greater, and so that the jacket standing upon one open end the kettle may be set into the other open end and rest upon the bead, it being immaterial which end is upward.

The kettle is readily set into the jacket or removed therefrom, as occasion may require, the two being entirely disconnected. Thus furnished to the trade or to users, if the kettle is broken, it can be readily replaced with another kettle, and without renewing or making any formal connection between the kettle and jacket, as required where the jacket is made substantially a permanent part of the kettle. The bead at the edge presents a broad surface upon which the kettle will rest, and also sustains the jacket in its proper shape.

The depth of the jacket being greater than the depth of the kettle from the bearing-shoulder to the bottom, the kettle is supported in a position elevated above the heating-surface, upon which the jacket rests, and the jacket being alike at both ends it is immaterial which end is set uppermost.

I do not wish to be understood as claiming, broadly, a kettle provided with an open-bottom jacket, or a kettle adapted to removably set into a surrounding vessel, as such, I am aware, is not new, my invention being in the specific construction of the kettle and its jacket, as hereinafter particularly recited.

I claim—

The herein-described cooking-vessel, consisting of the vessel A, constructed with an annular shoulder, $d$, upon its outside near its upper edge, and also provided with a bail, combined with a jacket, D, made from sheet metal of ring shape and of a depth greater than the depth of the kettle from said shoulder to the bottom, the internal diameter of the jacket at both its upper and lower ends corresponding substantially to the diameter of the kettle at the said shoulder, substantially as described, and whereby the said jacket is not only made detachable from the kettle, but is also adapted to be inverted.

HENRY A. MANNING.

Witnesses:
JOSEPH F. WARD,
DENNIS J. McGRATH.